US006168737B1

(12) United States Patent
Poco et al.

(10) Patent No.: US 6,168,737 B1
(45) Date of Patent: Jan. 2, 2001

(54) METHOD OF CASTING PATTERNED DIELECTRIC STRUCTURES

(75) Inventors: John F. Poco; Lawrence W. Hrubesh, both of Livermore, CA (US)

(73) Assignee: The Regents of the University of California, Oakland, CA (US)

( * ) Notice: Under 35 U.S.C. 154(b), the term of this patent shall be extended for 0 days.

(21) Appl. No.: 09/028,040

(22) Filed: Feb. 23, 1998

(51) Int. Cl.[7] .................... B29C 39/02; H01J 9/00
(52) U.S. Cl. .................... 264/129; 264/250; 264/299; 445/24
(58) Field of Search .................... 264/621, 650, 264/299, 129, 250; 445/24

(56) References Cited

U.S. PATENT DOCUMENTS

| | | | |
|---|---|---|---|
| 4,266,978 | * 5/1981 | Prochazka | 252/317 |
| 4,686,195 | * 8/1987 | Yamane | 501/12 |
| 4,790,893 | * 12/1988 | Watkins | 156/232 |
| 4,892,544 | * 1/1990 | Frisch | 264/236 |
| 5,205,770 | 4/1993 | Lowrey et al. | 445/24 |
| 5,232,549 | 8/1993 | Cathey et al. | 216/62 |
| 5,256,360 | * 10/1993 | Li | 264/219 |
| 5,484,314 | 1/1996 | Farnworth | 445/24 |
| 5,486,126 | 1/1996 | Cathey et al. | 445/25 |
| 5,492,234 | 2/1996 | Fox | 216/25 |
| 5,503,582 | 4/1996 | Cathey et al. | 445/24 |
| 5,509,840 | 4/1996 | Huang et al. | 445/24 |
| 5,547,483 | 8/1996 | Garcia et al. | 65/42 |
| 5,561,343 | 10/1996 | Lowe | 313/482 |
| 5,562,517 | 10/1996 | Taylor et al. | 445/25 |
| 5,589,731 | 12/1996 | Fahlen et al. | 313/495 |
| 5,629,583 | 5/1997 | Jones et al. | 313/495 |
| 5,650,690 | 7/1997 | Haven | 313/422 |
| 5,658,832 | 8/1997 | Bernhardt et al. | 264/272.11 |
| 5,663,608 | 9/1997 | Jones et al. | 313/309 |
| 5,667,418 | 9/1997 | Fahlen et al. | 445/25 |
| 5,675,212 | 10/1997 | Schmid et al. | 313/422 |
| 5,698,932 | 12/1997 | Cathey et al. | 313/292 |
| 5,700,391 | * 12/1997 | Nogami et al. | 252/299.01 |
| 5,746,635 | * 5/1998 | Spindt et al. | 445/24 |
| 5,750,459 | * 5/1998 | Marella et al. | 252/315.7 |
| 5,811,031 | * 9/1998 | Jansen et al. | 252/315.6 |
| 5,818,168 | * 10/1998 | Ushifusa et al. | 313/582 |
| 5,824,250 | * 10/1998 | Whalen et al. | 264/219 |

* cited by examiner

Primary Examiner—Michael W. Ball
Assistant Examiner—Barbara J. Musser
(74) Attorney, Agent, or Firm—Alan H. Thompson

(57) ABSTRACT

A pattern of dielectric structures are formed directly on a substrate in a single step using sol-gel chemistry and molding procedures. The resulting dielectric structures are useful in vacuum applications for electronic devices. Porous, lightweight structures having a high aspect ratio that are suitable for use as spacers between the faceplate and baseplate of a field emission display can be manufactured using this method.

26 Claims, 3 Drawing Sheets

METHOD OF CASTING PATTERNED DIELECTRIC STRUCTURES

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a method for forming and patterning porous dielectrics, particularly for use as electrode spacers in microelectronics applications.

2. Description of Related Art

Dielectric materials are needed as electrode spacers in microelectronics circuits and devices, such as field emission displays. Flat panel displays, in particular, incorporate spacers in the evacuated cavity between a display faceplate and the emitting baseplate. The emitting surface has at least one electron emitter for each pixel on the display surface, and a high voltage differential is maintained between the two electrodes. The spacer must be non-conductive and not interfere with the flow of electrons between the plates. The spacer material must be stable under electron bombardment. The interelectrode spacing must be small and uniform to provide high image resolution. To manufacture lightweight, durable, portable large-area screens, the spacer material must be lightweight, yet have the mechanical strength capable of withstanding atmospheric pressure and other external pressures placed on the display screen. Microelectronic devices also normally require that the dielectric spacers have very small features and high aspect ratios (i.e., height to thickness ratios) so as not to interfere with display resolution.

Various methods have been developed to manufacture interelectrode spacers. U.S. Pat. No. 5,205,770, entitled "Method to form high aspect ratio supports (spacers) for field emission displays using micro-saw technology", discloses a technique that forms a mold using micro-saw technology and removes the mold by selective (chemical) etching. U.S. Pat. No. 5,698,932 entitled "Interelectrode spacers for display devices including field emission displays", discloses the fabrication of aerogel or xerogel spacers as a separate element in the display device using photochemical patterning and etching techniques. Both of these techniques employ chemical etching, which is time-consuming and expensive.

U.S. Pat. No. 5,658,832 to Bernhardt, entitled "Method of forming a spacer for field emission flat panel displays" discloses a method for making aerogel spacers, developed at Lawrence Livermore National Laboratory, that does not require chemical etching. The spacer is fabricated using a template or mold having through-holes formed therein; this template is placed in contact with the substrate. A release agent is applied to the mold before an aerogel precursor solution is poured into the holes. After the solution is gelled and dried, the mold is removed from the substrate to expose aerogel spacer structures. The mold and substrate must be in perfect contact to avoid leakage of the solution into the space between the mold and substrate, otherwise thin films of the aerogel form on the substrate.

The researchers at Lawrence Livermore National Laboratory have significantly improved and expanded the process of making spacers and other kinds of dielectric structures using molds. The present method does not require the use of a release agent or the use of a mold during the drying process, and further improves the quality and physical properties of the porous dielectric structures produced.

SUMMARY OF THE INVENTION

The present invention is a process for forming patterned dielectric structures using molds. The method uses sol-gel chemistry to form a porous dielectric material and molding procedures to produce a high aspect ratio pattern. The resulting structures are formed directly on a substrate (such as a glass plate) and comprise inorganic microporous or mesoporous materials, including aerogels and xerogels. Porous materials (i.e., less than full density) are particularly desirable because of their low weight. A variety of structures may be formed, such as posts, cylindrical pillars, and walls. A typical pattern is an array of square posts (e.g., 25 microns on a side), spaced apart by 300 microns and having a height of at least 250 microns. The desired aspect ratios are typically 10 or greater.

The objective of this invention is to fabricate patterned, gel-derived dielectric structures suitable for use in vacuum environments for electronic devices, such as spacers between the faceplate and baseplate of a display panel. Another objective is to provide a low cost method of forming, in a single process step, lightweight dielectric spacers directly on a substrate, such as a faceplate or baseplate of a field emission display.

Other applications of the patterned dielectric structures include insulators in multichip module electronic circuits, microchannel plates for electron gain devices, thermal insulators, and lightweight support structures for space applications. The microporous and mesoporous materials have extremely small pores, which are ideal for high voltage insulators where secondary electron emission must be minimized. In addition, these materials do not contain organics that can outgas and contaminate a vacuum environment.

DETAILED DESCRIPTION OF THE INVENTION

The present invention of forming dielectric structures on a substrate begins with providing a reusable mold having a pattern of cavities with the desired dimensions. This mold is filled with a precursor solution, which is gelled and dried to form highly porous dielectric structures directly on the substrate.

Figure 1A:
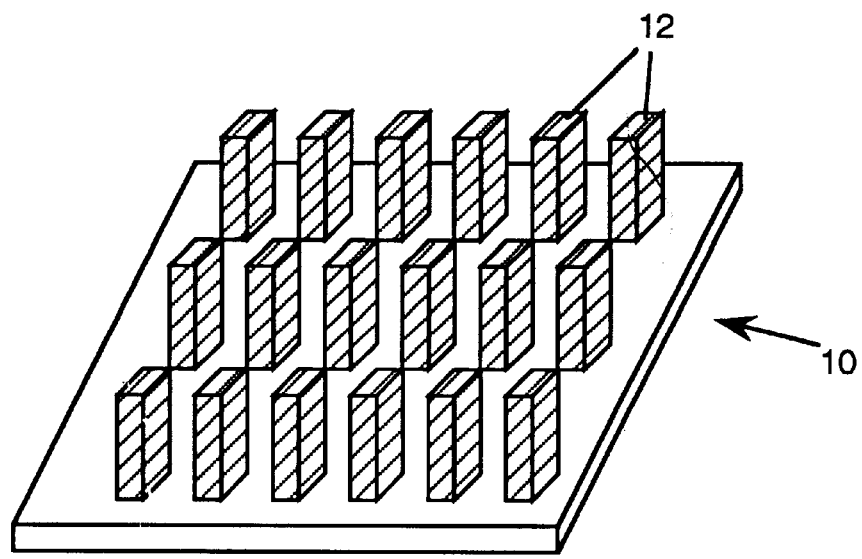
FIGS. 1A–1B show the fabrication of a mold for use in the present invention.

The mold into which the gel is cast is first formed using a primary mold (or mandrel) with structures mimicking the final desired dielectric structures. For example, FIG. 1A shows a primary or "positive" mold 10 with an array of rectangular posts 12. Other types of dielectric structures that can be made with this type of mold include walls and cylindrical pillars. In the preferred embodiment, the primary mold 10 is formed of a hard, refractory ceramic material, such as microcrystalline tungsten carbide, on which minute structures are machined. The tungsten carbide mold is strong and can be reused indefinitely. Other practical primary molds have been demonstrated using alternative materials and means of fabrication.

Figure 1B:
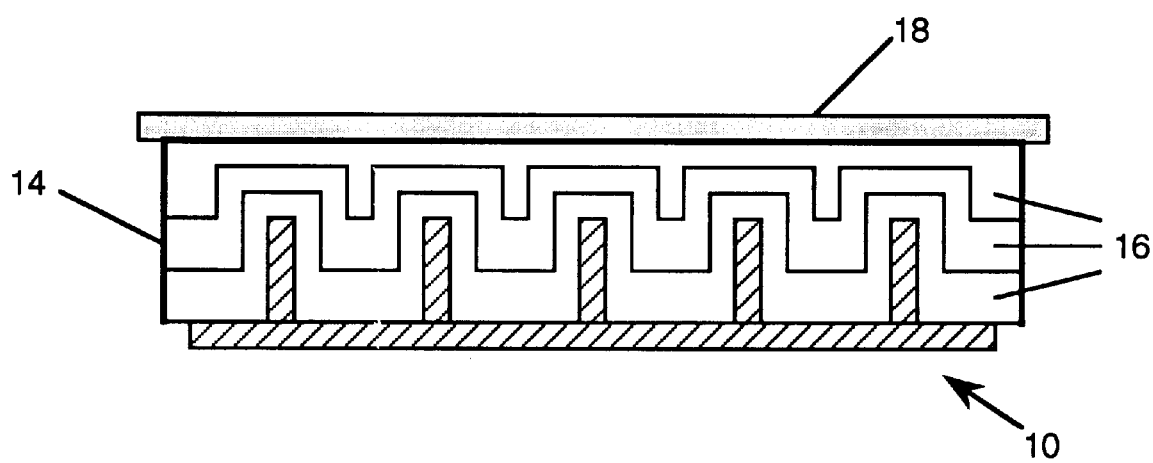

As shown in FIG. 1B, the primary mold 10 is covered with a molding material from which a secondary or "negative" mold 14 is formed using a hot press technique. In the preferred embodiment, the molding material comprises, a sheet or sheets 16 of a polymeric material, such as polyethylene, polypropylene, and polyimide. The sheets 16 are held under pressure (e.g., 1–2 psi) and heated (e.g., 160° C.) until the polymeric material softens and flows over and into all of the spaces of the primary mold 10. The molding is done under a rough vacuum to ensure that the spaces are filled, without trapping any voids. The polymeric material is then cooled to form a solid mold 14, which is typically about 750 microns in thickness. The mold 14 can also be formed by injection molding. A flat backing 18, such as a glass sheet, may be attached to the mold 14 for purposes of applying pressure and handling of the mold 14.

The resulting mold 14 is reusable and has a pattern of cavities in the form of grooves, channels, or wells having flat or curved walls, into which the dielectric material is cast. Since the material shrinks as it forms within the mold 14, the dimensions of the cavities and their spacing in the mold 14 must take this change of volume into account. Typically, the dimensions of the cavities will be larger (20–40%) than the final structures.

The term "porous dielectric material" as used here includes microporous and mesoporous solids having open and connected pores, such as polymer foams, pre-ceramics, porous glasses, aerogels, and xerogels. The porous material is formed from a precursor solution that is dried by removing the liquid from a two-phase liquid-solid network. The network of one class of porous materials, aerogels and xerogels, is typically produced in a two-step process. The manufacture of aerogels and xerogels is well-known in the art; see U.S. Pat. Nos. 5,275,796, 5,409,683, and 5,686,031 for processes of making inorganic aerogels and xerogels.

In general, the first step in the fabrication of porous materials is to prepare a precursor solution and pour it into the mold. The precursor solution is selected to reactively produce metal oxides that exhibit dielectric properties when dried. The typical precursor includes a silicate compound, preferably an alkali silicate or a silicon alkoxide, either of which provide good adhesion to glass substrates. Other metal alkoxides, such as aluminum (e.g., aluminum isopropoxide), tantalum (e.g., tantalum ethoxide), and titanium (e.g., titanium ethoxide), may also be used as a precursor to form suitable metal oxide porous dielectric spacers. The use of alkali silicates constitutes a significant cost reduction in the manufacturing process, however, as the metal alkoxides are considerably more expensive.

In the mold, particles called "sols" are formed within the mixture. The sols link until a connected solid structure forms, which is surrounded by a liquid. The combination of a porous, connected solid phase dispersed in a liquid comprises a two-phase gel. In the second step, after gelation is complete, and often after additional time for aging, the gel is dried by removing the liquid from the pores so that the porosity of the wet gel changes minimally. Depending on the concentration of the precursor solution and other factors, the gelling step can occur in minutes or hours. The density of the final material is controlled by the concentration of the precursor solution and the drying process used (e.g., extraction of the liquid above its critical point vs. evaporation).

Although porous materials are preferred because of their light weight, the present invention can also be used to make full density dielectric structures. Porous materials like aerogels are also characterized by nanometer size pores and particles, where size depends on the density (porosity) and the chemistry of formation. The aerogel particles range in size from less than two nanometers to 20 nanometers, and the average pore size is typically less than 80 nanometers. In all cases, the dimensions of the pores and particles in aerogels are less than the wavelengths of visible light, resulting in transparency and other exceptional properties. Xerogels are a denser form of aerogel and are formed by removing the liquid in the gel by evaporation under atmospheric conditions. The pore sizes in the gel are so small that the flow of liquid to the surface from within the gel is limited. In evaporative drying, the surface tension of the liquid in the small pores creates extremely high forces as the material dries, which tends to collapse the weak solid structure of the gel. The gels are typically not strong enough to resist this shrinkage during evaporation, resulting in a denser final material.

Figure 2A:
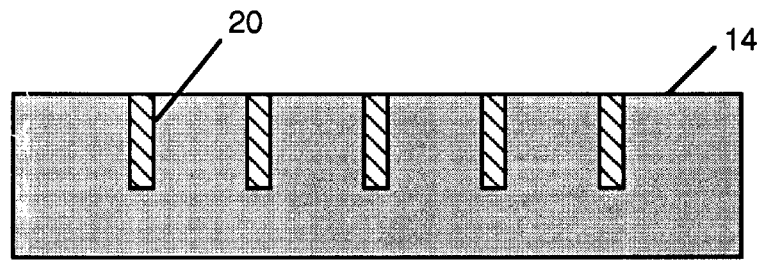
FIGS. 2A–2D show the process of making porous dielectric structures according to the present invention.
Figure 2B:
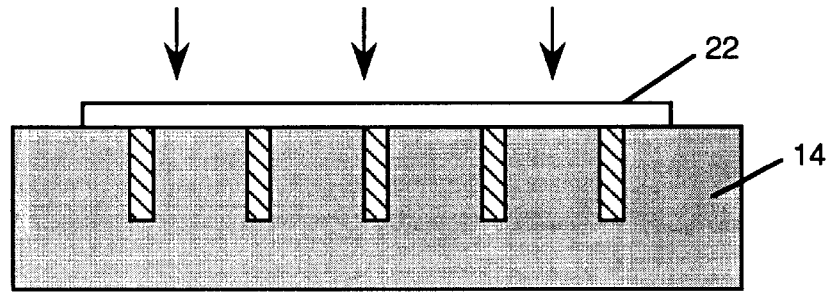
Figure 2C:
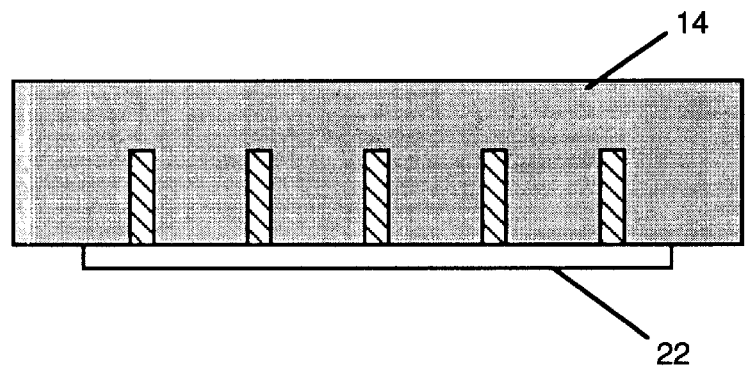

FIG. 2A shows the mold 14 with rectangular cavities 20, which are filled with precursor solution. To achieve complete filling with no void space, the mold is immersed in the precursor solution and a vacuum is applied to pull trapped air out of the cavities in the mold. After the mold 14 is removed from the vacuum, extra precursor solution may be added to the mold 14 as needed. A substrate 22, such as a glass electrode plate for an imaging display device, is placed on top of the mold 14, as shown in FIG. 2B. Optionally, the filled mold and substrate 22 may be inverted, as shown in FIG. 2C. Pressure is exerted on the substrate 22 and mold to squeeze out any extra solution. The precursor solution is allowed to gel, and this process may be accelerated by raising the temperature (e.g., 65–80° C.).

When the gelled structures have shrunk sufficiently, the substrate 22 and the mold 14 are carefully separated so that damage to the gelled structures is minimized or eliminated. This separation can be accomplished successfully by using a fixture (e.g., vacuum chuck) that maintains precise alignment of the substrate 22 and the mold 14 during separation. Any misalignment or offset of the substrate 22 and the mold 14 can cause the structures to break. The substrate 22 and gelled structures may be flushed with water to remove residual reagents or other contaminants, and then dried in air. The evaporation will cause additional shrinkage of the porous structures. To accelerate the drying process, the gel may be dried at temperatures (e.g., 65° C.) greater than room temperature.

Figure 2D:
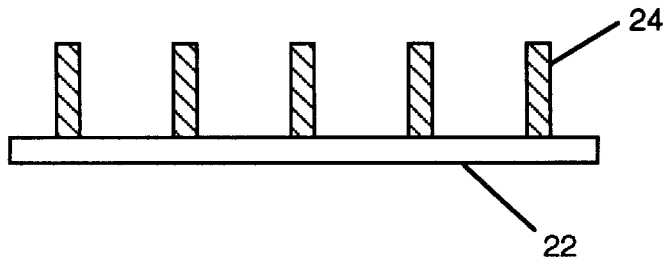
Figure 3:
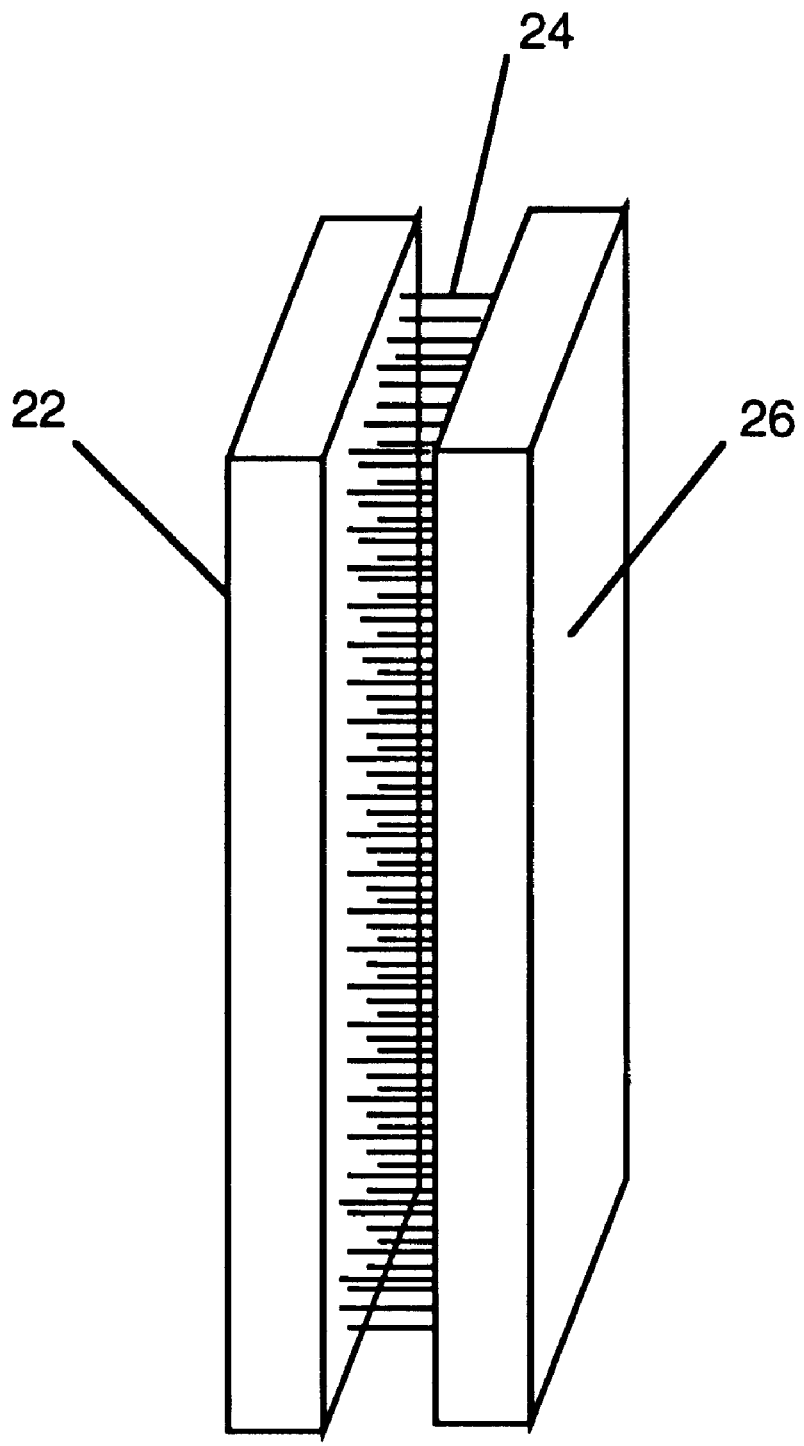
FIG. 3 shows porous dielectric structures fabricated according to the present invention in a field emission display.

FIG. 2D shows the resulting substrate 22 with porous structures 24 attached. Any thin film of excess porous material on the substrate can be quickly removed by chemical etching; for example, a buffered hydrofluoric acid solution is suitable for removing silica materials. The method of the present invention is scalable to large areas. FIG. 3 shows the use of the porous dielectric structures 24 between two substrates 22,26 in an assembled field emission display.

The structures 24 may be treated or coated in a variety of ways to alter their mechanical, electrical, or chemical properties. The structures may be stiffened or strengthened by heat treatment or by spraying a metal alkoxide (e.g., tetramethoxysilane, tetraethoxysilane) onto the structures. Alternatively, the structures may be soaked in a solution containing carbon or metallic particles, which will provide sufficient conductivity to prevent charge build-up and reduce secondary electron emission. Additionally, before the porous materials are even cast, the precursor solution may be doped with a variety of elements or compounds (e.g., metal ions, metallic particles, carbon) that can alter the material properties. Such doping is common in the manufacture of microporous materials such as aerogels and xerogels.

The foregoing description of preferred embodiments of the invention is presented for purposes of illustration and description and is not intended to be exhaustive or to limit the invention to the precise form disclosed. Many modifications and variations are possible in light of the above teaching.

The invention claimed is:

1. A method for making a pattern of dielectric structures on a substrate, comprising:

providing a mold having a pattern of cavities formed therein;

filling the cavities in the mold with a precursor solution and removing any trapped air in the cavities;

covering the filled mold with a solid substrate in contact with the precursor solution of the filled cavities;

allowing the precursor solution to get and attach to the solid substrate;

separating the solid substrate with attached gelled structures from the mold;

drying the gelled structures to form a pattern of dielectric structures on the solid substrate, and treating the structures after drying for altering the properties of the structures by spraying a metal alkoxide on the structures.

2. The method as recited in claim 1, wherein removing trapped air is carried out by immersing the mold in precursor solution and placing the filled mold under vacuum.

3. The method as recited in claim 1, further comprising providing a precursor solution comprising an alkali silicate.

4. The method as recited in claim 1, further comprising providing a precursor solution comprising a metal alkoxide.

5. The method as recited in claim 4, wherein the metal is selected from the group consisting of silicon, titanium, tantalum, and aluminum.

6. The method as recited in claim 1, further comprising providing a precursor solution comprising carbon.

7. The method as recited in claim 1, further comprising providing a precursor solution comprising metallic particles.

8. The method as recited in claim 1, further comprising providing a precursor solution comprising metal ion dopants.

9. The method as recited in claim 1, wherein separating the substrate and mold is carried out using means to precisely align the substrate and mold during separation to minimize damage to the dielectric structures.

10. The method as recited in claim 1, wherein drying the gelled structures is carried out by evaporation.

11. The method as recited in claim 1, wherein the solution comprises a material selected from carbon, metallic ions, and metallic particles.

12. The method as recited in claim 1, wherein the substrate comprises an electrode.

13. The method as recited in claim 1, wherein the substrate comprises a faceplate or a baseplate of an imaging display device.

14. The method as recited in claim 13, further comprising placing a second substrate on top of the dielectric structures to form a display panel.

15. The method as recited in claim 1, wherein providing the mold having a pattern of cavities comprises:

providing a primary mold with a pattern of structures formed thereon;

completely covering the primary mold with a molding material;

forming a secondary mold having a pattern of cavities, wherein the secondary mold comprises the molding material; and removing the secondary mold from the primary mold.

16. The method as recited in claim 15, wherein forming the secondary mold having a pattern of cavities comprises:

heating the molding material until the material completely covers the structures; and cooling the molding material to form the secondary mold.

17. The method as recited in claim 15, wherein forming the secondary mold having a pattern of cavities is carried out by injection molding.

18. The method as recited in claim 15, wherein the primary mold comprises a machineable ceramic material.

19. The method as recited in claim 15, wherein the molding material comprises a polymeric material.

20. The method as recited in claim 15, further comprising attaching a backing to the secondary mold.

21. A method for making a pattern of dielectric structures on a substrate, comprising:

providing a mold having a pattern of cavities formed therein;

filling the cavities in the mold with a precursor solution and removing any trapped air in the cavities;

covering the filled mold with a substrate in contact with the filled cavities;

allowing the precursor solution to gel and attach to the substrate;

separating the substrate with attached gelled structures from the mold;

drying the gelled structures to form a pattern of dielectric structures on the substrate; and applying a coating on the structures after drying, wherein the coating comprises a metal alkoxide.

22. The method of claim 1, wherein the pattern of cavities in the mold extend only partially through the mold.

23. The method of claim 1, additionally including adding precursor solution to the cavities following removing any trapped air in the cavities to assure that the cavities are totally filled with precursor solution.

24. The method of claim 1, additionally including inverting the mold and substrate following covering the filled mold.

25. The method of claim 1, additionally including exerting pressure on the substrate and mold to remove any excess precursor solution following covering the filled mold.

26. The method of claim 1, additionally including doping the precursor solution with a dopant selected from the group consisting of metal ions, metallic particles, and carbon to alter the material properties, prior to filling the cavities in the mold.

* * * * *